United States Patent
Chin et al.

(10) Patent No.: US 12,520,216 B2
(45) Date of Patent: Jan. 6, 2026

(54) DETECTING AND PREVENTING PING-PONG EVENTS

(71) Applicant: QUALCOMM Incorporated, San Diego, CA (US)

(72) Inventors: Tom Chin, San Diego, CA (US); Sharda Ranjan, Hyderabad (IN); Naga Chandan Babu Gudivada, Hyderabad (IN); Xuqiang Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/252,862

(22) PCT Filed: Jan. 5, 2021

(86) PCT No.: PCT/CN2021/070254
§ 371 (c)(1),
(2) Date: May 12, 2023

(87) PCT Pub. No.: WO2022/147643
PCT Pub. Date: Jul. 14, 2022

(65) Prior Publication Data
US 2023/0422130 A1    Dec. 28, 2023

(51) Int. Cl.
*H04W 36/30* (2009.01)
*H04B 17/318* (2015.01)
*H04W 36/14* (2009.01)

(52) U.S. Cl.
CPC ........ *H04W 36/305* (2018.08); *H04B 17/328* (2023.05); *H04W 36/1443* (2023.05)

(58) Field of Classification Search
CPC .......... H04W 36/305; H04W 36/1443; H04W 76/19; H04B 17/328
See application file for complete search history.

(56) References Cited

U.S. PATENT DOCUMENTS

2014/0274063 A1    9/2014  Singh et al.
2020/0323005 A1   10/2020  Chin et al.
(Continued)

FOREIGN PATENT DOCUMENTS

CN    105208609 A    12/2015
WO    2020155094     8/2020

OTHER PUBLICATIONS

International Search Report and Written Opinion—PCT/CN2021/070254—ISA/EPO—Aug. 31, 2021.
(Continued)

*Primary Examiner* — Dhaval V Patel
(74) *Attorney, Agent, or Firm* — Harrity & Harrity, LLP

(57) ABSTRACT

Various aspects of the present disclosure generally relate to wireless communication. In some aspects, a user equipment (UE) may detect a ping-pong event between a non-standalone (NSA) New Radio (NR) network and a standalone (SA) legacy network. The UE may transmit, to the SA legacy network, an indication of radio link failure with the NSA NR network, based at least in part on the ping-pong event and one or more indicators of channel quality with the NSA NR network. The UE may measure, periodically, one or more reference signals from the NSA NR network. The UE may reconnect to the NSA NR network based at least in part on the one or more reference signals satisfying at least one condition. Numerous other aspects are provided.

30 Claims, 8 Drawing Sheets

(56) References Cited

U.S. PATENT DOCUMENTS

| | | | |
|---|---|---|---|
| 2021/0029600 A1* | 1/2021 | Balan | H04W 36/0094 |
| 2021/0345454 A1* | 11/2021 | Dhanapal | H04W 76/27 |
| 2022/0141738 A1* | 5/2022 | Chou | H04W 36/00837 |
| | | | 455/437 |
| 2022/0159550 A1* | 5/2022 | Vivanco | H04W 36/328 |

OTHER PUBLICATIONS

TCL, "Ping Pong Issue for Conditional Handover" 3GPP TSG-RAN2#99, R2-1707869, Aug. 25, 2017 (Aug. 25, 2017), 2 Pages, see the whole document.

* cited by examiner

DETECTING AND PREVENTING PING-PONG EVENTS

CROSS-REFERENCE TO RELATED APPLICATION

This application is a 371 national stage of PCT Application No. PCT/CN2021/070254 filed on Jan. 5, 2021, entitled "DETECTING AND PREVENTING PING-PONG EVENTS," which is hereby expressly incorporated by reference herein

FIELD OF THE DISCLOSURE

Aspects of the present disclosure generally relate to wireless communication and to techniques and apparatuses for detecting and preventing ping-pong events.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a ping-pong event between a non-standalone (NSA) New Radio (NR) network and a standalone (SA) legacy network; transmitting, to the SA legacy network, an indication of radio link failure (RLF) with the NSA NR network, based at least in part on the ping-pong event and one or more indicators of channel quality with the NSA NR network; measuring, periodically, one or more reference signals from the NSA NR network; and reconnecting to the NSA NR network based at least in part on the one or more reference signals satisfying at least one condition.

In some aspects, a method of wireless communication performed by a UE includes detecting a ping-pong event between a first SA network and a second SA network; modifying at least one of an offset or a priority associated with the first SA network based at least in part on the ping-pong event; measuring, periodically, one or more reference signals from the first SA network; and reconnecting to the first SA network based at least in part on the one or more reference signals satisfying at least one condition.

In some aspects, a UE for wireless communication includes a memory and one or more processors operatively coupled to the memory, the memory and the one or more processors configured to detect a ping-pong event between an NSA NR network and an SA legacy network; transmit, to the SA legacy network, an indication of RLF with the NSA NR network, based at least in part on the ping-pong event and one or more indicators of channel quality with the NSA NR network; measure, periodically, one or more reference signals from the NSA NR network; and reconnect to the NSA NR network based at least in part on the one or more reference signals satisfying at least one condition.

In some aspects, a UE for wireless communication includes a memory and one or more processors operatively coupled to the memory, the memory and the one or more processors configured to detect a ping-pong event between a first SA network and a second SA network; modify at least one of an offset or a priority associated with the first SA network based at least in part on the ping-pong event; measure, periodically, one or more reference signals from the first SA network; and reconnect to the first SA network based at least in part on the one or more reference signals satisfying at least one condition.

In some aspects, a non-transitory computer-readable medium storing a set of instructions for wireless communication includes one or more instructions that, when executed by one or more processors of a UE, cause the UE to detect a ping-pong event between an NSA NR network and an SA legacy network; transmit, to the SA legacy network, an indication of RLF with the NSA NR network, based at least in part on the ping-pong event and one or more indicators of channel quality with the NSA NR network; measure, periodically, one or more reference signals from the NSA NR network; and reconnect to the NSA NR network based at least in part on the one or more reference signals satisfying at least one condition.

In some aspects, a non-transitory computer-readable medium storing a set of instructions for wireless communication includes one or more instructions that, when executed by one or more processors of a UE, cause the UE to detect a ping-pong event between a first SA network and a second SA network; modify at least one of an offset or a priority associated with the first SA network based at least in part on the ping-pong event; measure, periodically, one or more reference signals from the first SA network; and reconnect to the first SA network based at least in part on the one or more reference signals satisfying at least one condition.

In some aspects, an apparatus for wireless communication includes means for detecting a ping-pong event between an NSA NR network and an SA legacy network; means for transmitting, to the SA legacy network, an indication of RLF with the NSA NR network, based at least in part on the ping-pong event and one or more indicators of channel quality with the NSA NR network; means for measuring, periodically, one or more reference signals from the NSA NR network; and means for reconnecting to the NSA NR network based at least in part on the one or more reference signals satisfying at least one condition.

In some aspects, an apparatus for wireless communication includes means for detecting a ping-pong event between a first SA network and a second SA network; means for modifying at least one of an offset or a priority associated with the first SA network based at least in part on the ping-pong event; means for measuring, periodically, one or more reference signals from the first SA network; and means for reconnecting to the first SA network based at least in part on the one or more reference signals satisfying at least one condition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
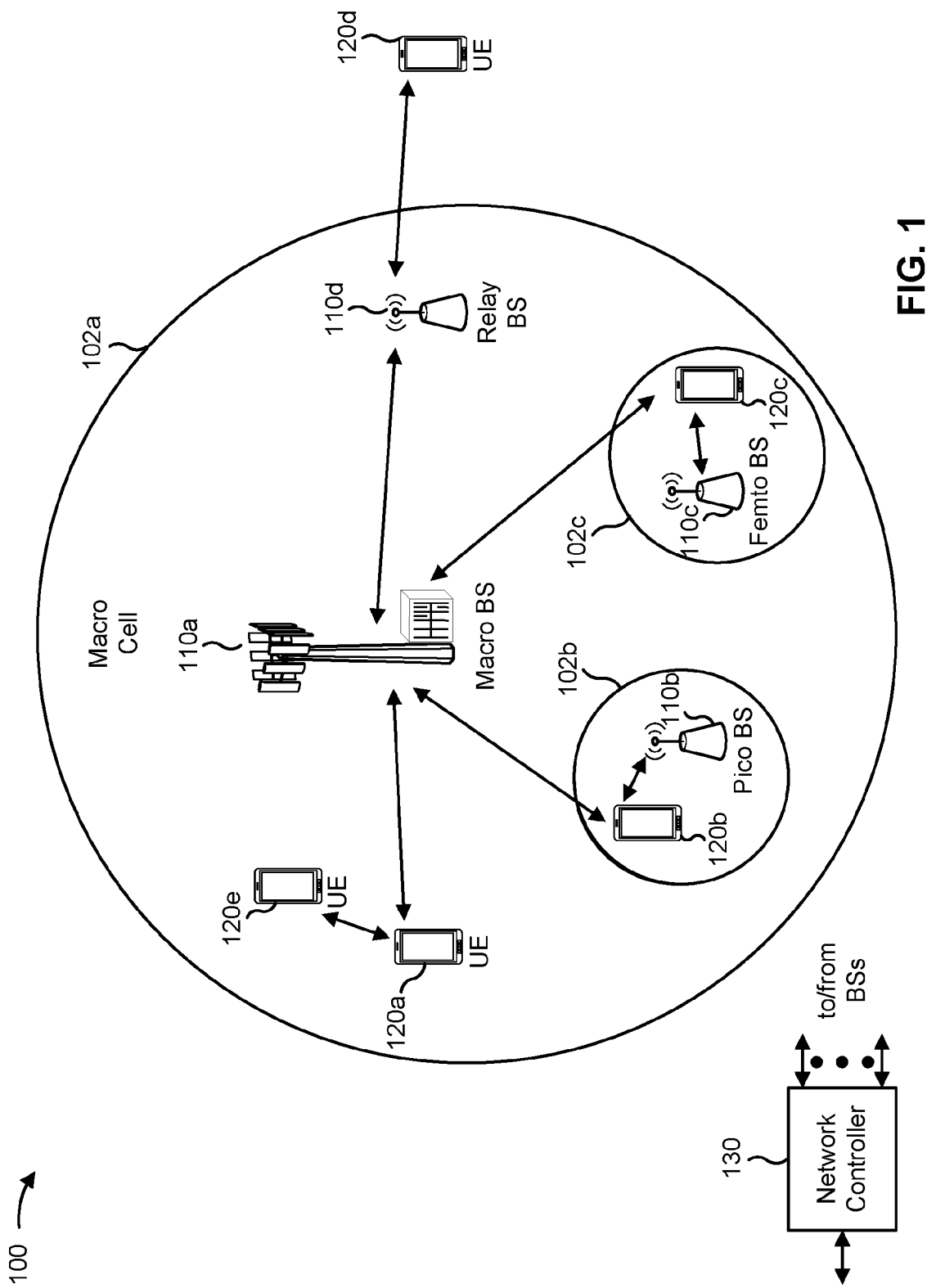
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
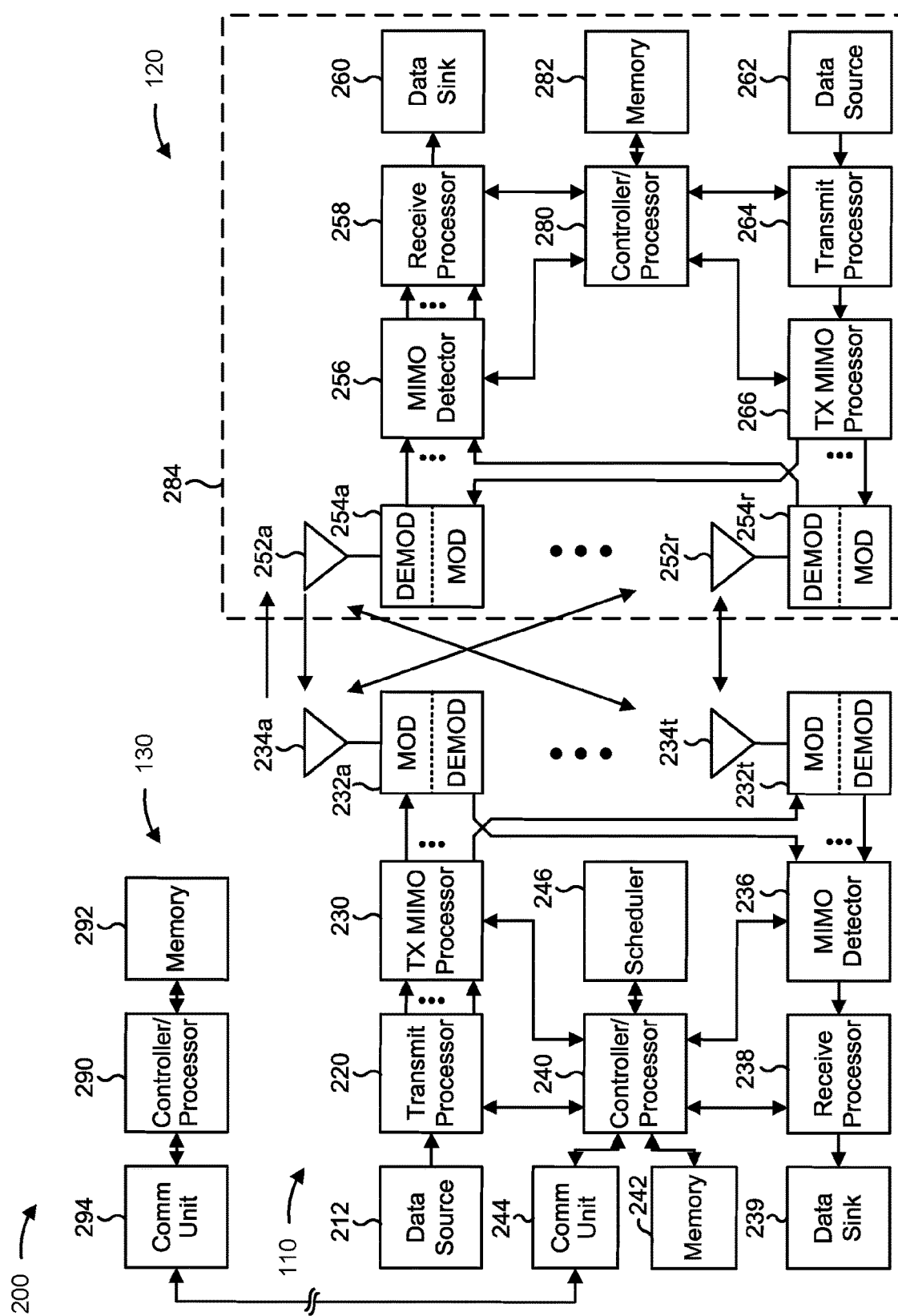
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with detecting and preventing ping-pong events, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, a UE (e.g., UE 120 and/or apparatus 700 of FIG. 7) may include means for detecting a ping-pong event between a non-standalone (NSA) New Radio (NR) network and a standalone (SA) legacy network; means for transmitting, to the SA legacy network, an indication of radio link failure (RLF) with the NSA NR network, based at least in part on the ping-pong event and one or more indicators of channel quality with the NSA NR network; means for measuring, periodically, one or more reference signals from the NSA NR network; and/or means for reconnecting to the NSA NR network based at least in part on the one or more reference signals satisfying at least one condition. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE may further include means for determining the at least one condition based on contextual information associated with the UE.

In some aspects, a UE (e.g., UE 120 and/or apparatus 700 of FIG. 7) includes means for detecting a ping-pong event between a first SA network and a second SA network; means for modifying at least one of an offset or a priority associated with the first SA network based at least in part on the ping-pong event; means for measuring, periodically, one or more reference signals from the first SA network; and/or means for reconnecting to the first SA network based at least in part on the one or more reference signals satisfying at least one condition. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE may further include means for refraining from measuring the one or more reference signals for an amount of time after detecting the ping-pong event. Additionally, or alternatively, the UE may include means for determining the at least one condition based on contextual information associated with the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some situations, a UE may connect to an SA legacy network (e.g., an LTE network) and then, based at least in part on measurements of one or more reference signals (e.g., a synchronization signal block (SSB), a tracking reference signal (TRS), and/or another reference signal), connect to an NSA NR network supported by the SA legacy network. For example, the NSA NR network may support an additional data plane with the UE while the SA legacy network supports a data plane and a control plane with the UE. Additionally, the NSA NR network may be supported by the same core network that supports the SA legacy network. Accordingly, the NSA NR network may be added as a secondary cell group (SCG) for the SA legacy network. The UE may connect to both networks using an evolved universal mobile telecommunications system (UMTS) terrestrial radio (E-UTRA) NR dual connectivity (EN-DC) mode and/or another similar dual connectivity mode.

When a signal strength of the NSA NR network is low and/or the NSA NR network supports a narrow bandwidth (e.g., band n5 with a width of 5 MHz), the UE may experience lower throughput and may experience increased cyclic redundancy check (CRC) failures. Accordingly, the UE may remove the NSA NR network as the SCG. However, because the measurements of one or more reference signals may continue to satisfy one or more thresholds for performing SCG addition, the UE may ping-pong between adding the SCG and removing it. As used herein, then, a "ping-pong event" may include one or more cycles of adding and removing a cell of the NSA NR network as an SCG. Accordingly, the UE will waste processing and network resources by continuing to add and remove the NSA NR network and experience low throughput and increased CRC failures whenever the NSA NR network is added.

Some techniques and apparatuses described herein enable a UE (e.g., UE 120) to detect a ping-pong event with an NSA NR network and declare RLF with the NSA NR network. Additionally, in some aspects, the UE 120 may adjust a periodicity, a threshold, and/or an offset associated with measurements of one or more reference signals from the NSA NR network to prevent future ping-pong events. As a result, the UE 120 may conserve processing and network resources by avoiding ping-pong events as well as increasing throughput and reducing CRC failures by declining to add the NSA NR network as an SCG.

Similarly, in some situations, a UE may connect to an SA legacy network (e.g., an LTE network) and then, based at least in part on measurements of one or more reference signals (e.g., an SSB, a TRS, and/or another reference signal), switch to an SA NR network. For example, the SA legacy network may trigger a handover to the SA NR network, the SA NR network may trigger a handover back to the SA legacy network, and so on. Accordingly, the UE will waste processing and network resources by continuing to ping-pong between the SA NR network and the SA legacy network. As used herein, then, a "ping-pong event" may include one or more cycles of switching between a cell of the SA NR network and a cell of the SA legacy network.

Some techniques and apparatuses described herein enable a UE (e.g., UE 120) to detect a ping-pong event between an SA legacy network and an SA NR network. Additionally, in some aspects, the UE 120 may adjust a priority, a threshold, and/or an offset associated with measurements of one or more reference signals from the SA NR network or measurements of one or more reference signals from the SA legacy network in order to prevent future ping-pong events. As a result, the UE 120 may conserve processing and network resources by avoiding ping-pong events as well as increasing throughput and reducing CRC failures by selecting a stronger of the two SA networks to camp on.

Figure 3:
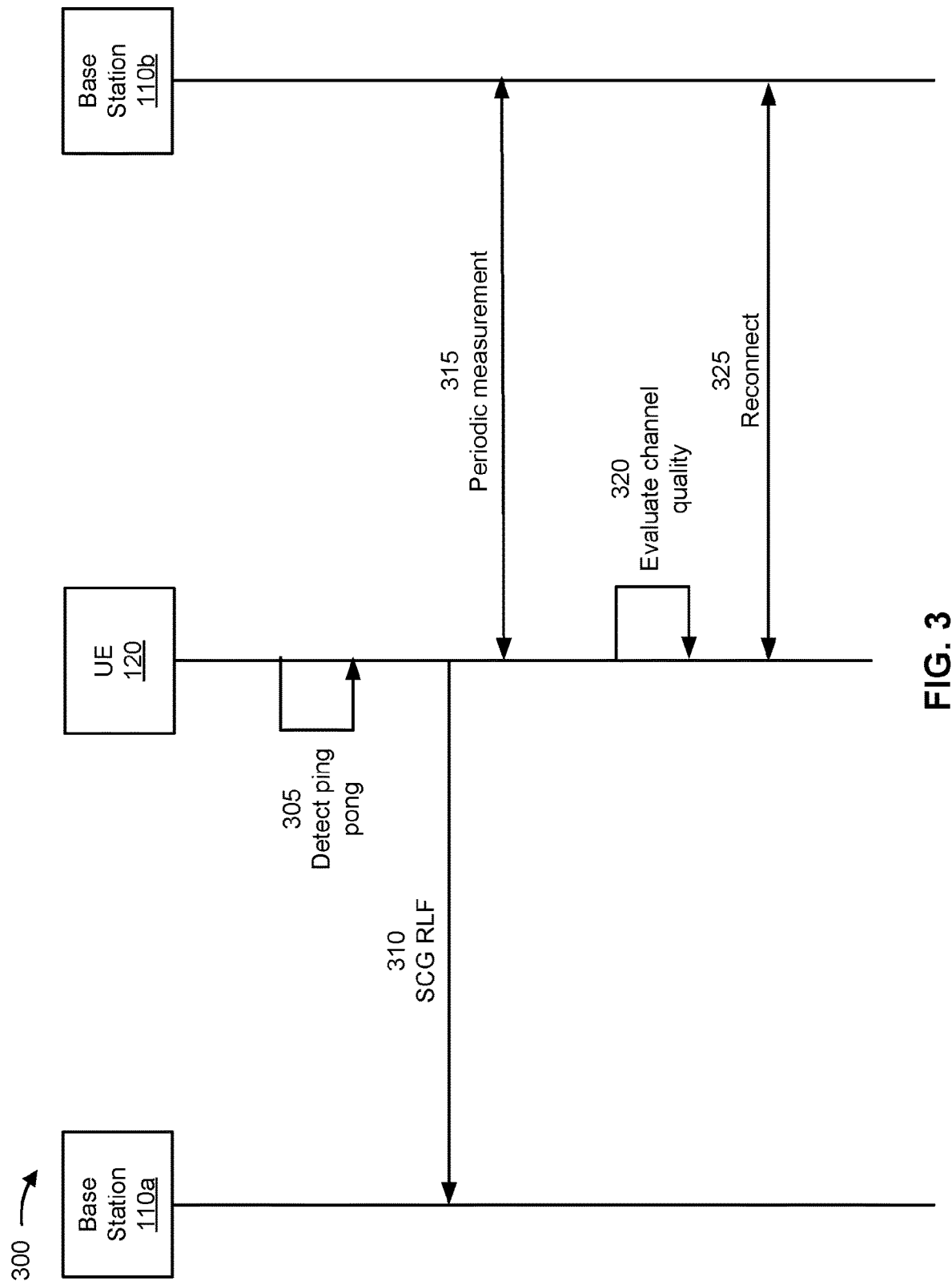
FIGS. 3 and 4 are diagrams illustrating examples associated with detecting and preventing ping-pong events, in accordance with various aspects of the present disclosure.

FIG. 3 is a diagram illustrating an example 300 associated with detecting and preventing ping-pong events, in accordance with various aspects of the present disclosure. As shown in FIG. 3, example 300 includes communication between a first base station 110a and a UE 120, as well as between a second base station 110b and the UE 120. In some aspects, the first base station 110a and the UE 120 may be included in a wireless network, such as wireless network 100. The first base station 110a may be a portion of an SA legacy network (e.g., an LTE network). For example, the first base station 110a may be included in a primary cell. In some aspects, the second base station 110b and the UE 120 may be included in another wireless network, such as wireless network 100. The second base station 110b may be a portion of an NSA NR network. For example, the first base station 110a may be included in an SCG.

As shown in connection with reference number 305, the UE 120 may a ping-pong event between the NSA NR network and the SA legacy network. For example, the first base station 110a may transmit, and the UE 120 may receive, an instruction (e.g., a radio resource control (RRC) reconfiguration message as defined in 3GPP specifications and/or another similar message) to add a 5G cell, including the second base station 110b, as an SCG. However, after connecting to the second base station 110b, the UE 120 may experience poor signal quality. For example, the first base station 110a may have determined than an RSRP associated with the 5G cell satisfied a threshold to add the 5G cell as an SCG, but the RSRP, the signal-to-noise ratio (SNR), and/or another variable associated with signal quality may remain low such that the UE 120 experiences reduced throughput and increased packet loss. Therefore, the UE 120 may remove the 5G cell, including the second base station 110b, as an SCG. A ping-pong event may thus include one or more cycles of adding and removing the 5G cell, including the second base station 110b, as an SCG.

Accordingly, in some aspects, the UE 120 may detect the ping-pong event by determining that a quantity of secondary cell additions of the NSA NR network and secondary cell removals of the NSA NR network satisfies a quantity threshold. For example, the UE 120 may detect the ping-pong event after one SCG addition of the NSA NR network and one SCG removal of the NSA NR network. In another example, the UE 120 may detect the ping-pong event after two SCG additions of the NSA NR network and two SCG removals of the NSA NR network. Other examples may include different quantities, such as three SCG additions of the NSA NR network and three SCG removals of the NSA NR network, four SCG additions of the NSA NR network and four SCG removals of the NSA NR network, and so on. The quantity threshold may be based at least in part on a configuration received from the first base station 110a and/or determined by the UE 120 (e.g., using records of previous ping-pong events). Additionally, or alternatively, the quantity threshold may be programmed (and/or otherwise preconfigured) into the UE 120 and/or the first base station 110a (e.g., based at least in part on 3GPP specifications and/or other standards).

In some aspects, the UE 120 may determine the quantity of secondary cell additions of the NSA NR network and secondary cell removals of the NSA NR network within a duration of time. For example, the UE 120 may determine a quantity of SCG additions of the NSA NR network and SCG removals of the NSA NR network within 1 minute, 2 minutes, 5 minutes, or X minutes, where X is an integer or a decimal amount. The duration of time may be based at least in part on a configuration received from the first base station 110a and/or determined by the UE 120 (e.g., using records of previous ping-pong events). Additionally, or alternatively, the duration of time may be programmed (and/or otherwise preconfigured) into the UE 120 and/or the first base station 110a (e.g., based at least in part on 3GPP specifications and/or other standards).

As shown in connection with reference number 310, the UE 120 may transmit, and the base station 110a may receive, an indication of RLF with the NSA NR network, based at least in part on the ping-pong event and one or more indicators of channel quality with the NSA NR network. For example, the UE 120 may transmit the indication of RLF when the UE 120 detects the ping-pong event and when the UE 120 determines that the one or more indicators of channel quality satisfy at least one channel quality threshold. In some aspects, the UE 120 may evaluate both whether the ping-pong event occurred and whether the one or more indicators of channel quality satisfy the at least one channel quality threshold, and then combine the evaluations (e.g., using an AND gate and/or another logic gate) to determine whether to transmit the indication of RLF. As an alternative, the UE 120 may refrain from evaluating whether the one or more indicators of channel quality satisfy the at least one channel quality threshold until the UE 120 detects the ping-pong event. As an alternative, the UE 120 may refrain from evaluating whether the ping-pong event occurred until the UE 120 determines that the one or more indicators of channel quality satisfy the at least one channel quality threshold.

In some aspects, the one or more indicators of channel quality with the NSA NR network may include an RSRP, an SNR, a CQI, or a combination thereof. In one example, the UE 120 may evaluate both the RSRP and the SNR to determine when the NSA NR network is providing low throughput, even when the RSRP was sufficient such that the first base station 110a determined to add the 5G cell of the NSA NR network as an SCG. In another example, the UE 120 may evaluate both the RSRP and the CQI. In yet another example, the UE 120 may evaluate both the SNR and the CQI. In another example, the UE 120 may evaluate the RSRP, the SNR, and the CQI.

In any of the aspects described above, the UE 120 may evaluate both a first indicator of channel quality (e.g., the RSRP, the SNR, the CQI, and/or another indicator) against a first channel quality threshold and a second indicator of channel quality (e.g., the RSRP, the SNR, the CQI, and/or another indicator) against a second channel quality threshold, and then combine the evaluations (e.g., using an AND gate and/or another logic gate) to determine whether to transmit the indication of RLF. Other examples may include additional indicators, such as evaluating a first indicator of channel quality against a first channel quality threshold, a second indicator of channel quality against a second channel quality threshold, and a third indicator of channel quality against a third channel quality threshold, and then combining the evaluations (e.g., using an AND gate and/or another logic gate) to determine whether to transmit the indication of RLF. As an alternative, the UE 120 may refrain from evaluating whether a second indicator of channel quality satisfies a second channel quality threshold until the UE 120 determines that a first indicator of channel quality satisfies a first channel quality threshold. Other examples may include additional indicators, such as refraining from evaluating whether a third indicator of channel quality satisfies a third channel quality threshold until the UE 120 determines that a second indicator of channel quality satisfies a second channel quality threshold, and refraining from evaluating whether the second indicator of channel quality satisfies the second channel quality threshold until the UE 120 determines that a first indicator of channel quality satisfies a first channel quality threshold.

In any of the aspects described above, the at least one channel quality threshold may be based at least in part on a configuration received from the first base station 110*a* and/or determined by the UE 120 (e.g., using records of previous channel quality indicators). Additionally, or alternatively, the at least one channel quality threshold may be programmed (and/or otherwise preconfigured) into the UE 120 and/or the first base station 110*a* (e.g., based at least in part on 3GPP specifications and/or other standards).

In any of the aspects described above, the SNR may be determined based at least in part on a demodulation reference signal (DMRS) and/or another reference signal. For example, the UE 120 may use the DMRS in order to determine whether the UE 120 expects low throughput even when an SNR based at least in part on an SSB, a TRS, or another synchronization signal is higher.

In some aspects, the indication of RLF may be based at least in part on a physical cell identifier (PCI) and an absolute radio frequency channel number (ARFCN). For example, the UE 120 may transmit the indication of the RLF including the PCI and the ARFCN in order to uniquely identify the 5G cell including the second base station 110*b*.

As shown in connection with reference number 315, the UE 120 may measure, periodically, one or more reference signals from the NSA NR network. As used herein, "measuring periodically" may refer to measurements that are repeated, on two or more occasions, in time, where the repetitions are separated by an amount of time based at least in part on a periodicity.

In some aspects, the one or more reference signals include an SSB, a TRS, or a combination thereof. For example, the UE 120 may measure the SSB, the TRS, and/or another synchronization signal transmitted by the second base station 110*b*. In some aspects, the measurements may include an RSRP, an SNR, a CQI, or a combination thereof. In some aspects, the SNR may be determined based at least in part on the SSB, the TRS, and/or another synchronization signal.

In some aspects, the periodicity associated with measuring the one or more reference signals is based at least in part on a mobility associated with the UE 120. For example, the UE 120 may determine a mobility (e.g., an estimated speed and/or estimated direction of movement) associated with the UE 120. The mobility may include a quantity (e.g., an estimated meters per second, kilometers per hour, or another numerical measure of speed and/or an estimated heading in degrees or another number numerical measure of direction) and/or a quality (e.g., a classification of the UE 120 as 'stationary,' 'slowly moving,' or 'quickly moving' or another non-numerical measure of speed and/or a classification of the UE 120 as moving north, south, east, or west or another non-numerical measure of direction). In some aspects, the UE 120 may decrease a period (e.g., linearly, step-wise, and/or according to another formula) associated with measuring the one or more reference signals as the mobility increases. Similarly, the UE 120 may increase the period (e.g., linearly, step-wise, and/or according to another formula) as the mobility decreases.

As shown in connection with reference number 320, the UE 120 may evaluate the one or more reference signals against at least one condition. For example, the UE 120 may determine whether one or more measurements (e.g., an RSRP, an SNR, a CQI, or a combination thereof) of the one or more reference signals satisfies the at least one condition.

In some aspects, the at least one condition may include an offset associated with the NSA NR network and the SA legacy network. For example, the offset may include an offset associated with an event (such as a B1-NR event, a B2-NR event, and/or another event defined in 3GPP specifications and/or other standards). The offset may be relative to one or more measurements (e.g., an RSRP, an SNR, a CQI, or a combination thereof) of one or more reference signals (e.g., a DMRS, an SSB, a TRS, and/or another reference or synchronization signal) transmitted by the first base station 110*a*. In some aspects, the offset may be based at least in part on the ping-pong event. For example, the UE 120 may increase the offset based at least in part on detecting the ping-pong event. Additionally, or alternatively, the offset may be based at least in part on a mobility associated with the UE 120. For example, the UE 120 may decrease the offset (e.g., linearly, step-wise, and/or according to another formula) as the mobility increases. Similarly, the UE 120 may increase the offset (e.g., linearly, step-wise, and/or according to another formula) as the mobility decreases.

Additionally, or alternatively, the at least one condition may include a threshold associated with the NSA NR network. For example, the threshold may include a threshold associated with an event (such as a B1-NR event, a B2-NR event, and/or another event defined in 3GPP specifications and/or other standards). The threshold may be an absolute value for one or more measurements (e.g., an RSRP, an SNR, a CQI, or a combination thereof) of one or more reference signals (e.g., an SSB, a IRS, and/or another synchronization signal) transmitted by the second base station 110*b*. In some aspects, the threshold may be based at least in part on the ping-pong event. For example, the UE 120 may increase the threshold based at least in part on detecting the ping-pong event. Additionally, or alternatively, the threshold may be based at least in part on a mobility associated with the UE 120. For example, the UE 120 may decrease the threshold (e.g., linearly, step-wise, and/or according to another formula) as the mobility increases. Similarly, the UE 120 may increase the threshold (e.g., linearly, step-wise, and/or according to another formula) as the mobility decreases.

In some aspects, the at least one condition may include an offset and a threshold. For example, the UE 120 may evaluate both whether one or more measurements (e.g., an RSRP, an SNR, a CQI, or a combination thereof) of one or more reference signals (e.g., an SSB, a TRS, and/or another synchronization signal) transmitted by the second base station 110*b* satisfy the threshold and whether those measurements satisfy the offset, and then combine the evaluations (e.g., using an AND gate and/or another logic gate) to determine whether to reconnect to the NSA NR network (e.g., as described below in connection with reference number 325). As an alternative, the UE 120 may refrain from evaluating whether the one or more measurements satisfy the threshold until the UE 120 determines that the one or more measurements satisfy the offset. As an alternative, the UE 120 may refrain from evaluating whether the one or more measurements satisfy the offset until the UE 120 determines that the one or more measurements satisfy the threshold.

In some aspects, the UE 120 may determine the at least one condition based on contextual information associated with the UE 120. The contextual information may include a date, a time of day, a location associated with the UE 120, a mobility associated with the UE 120, an identity associated with a user of the UE 120, and/or other contextual information received and/or determined by the UE 120. For example, the UE 120 may adjust the offset and/or the threshold based at least in part on a date and/or time of day. In such an example, the UE 120 may increase the offset and/or the threshold when the time of day is correlated with a pattern in which the UE 120 stays within a geographic area having a weaker 5G signal. Additionally, or alternatively, the UE 120 may adjust the offset and/or the threshold based at least in part on a location associated with the UE 120 and/or a mobility associated with the UE 120. In such an example, the UE 120 may decrease the offset and/or the threshold when the mobility is correlated with movement into a geographic area having a stronger 5G signal. Additionally, or alternatively, the UE 120 may adjust the offset and/or the threshold based at least in part on an identity associated with a user of the UE 120. In such an example, the UE 120 may increase the offset and/or the threshold when the user is correlated with one or more geographic areas having a weaker 5G signal. In some aspects, the UE 120 may determine the at least one condition using a machine-learning model, such as at least one neural network and/or another machine-learning model.

As shown in connection with reference number 325, the UE 120 may reconnect to the NSA NR network based at least in part on the one or more reference signals satisfying the at least one condition. For example, the UE 120 may transmit, and the first base station 110*a* may receive, one or more measurements (e.g., an RSRP, an SNR, a CQI, or a combination thereof) of one or more reference signals (e.g., an SSB, a TRS, and/or another synchronization signal) transmitted by the second base station 110*b*. Accordingly, the first base station 110*a* may transmit, and the UE 120 may receive, an instruction (e.g., an RRC reconfiguration message as defined in 3GPP specifications and/or another similar message) to add a 5G cell, including the second base station 110*b*, as an SCG.

By using the technique described in connection with FIG. 3, the UE 120 may detect a ping-pong event with the NSA NR network and declare RLF with the NSA NR network. Additionally, the UE 120 may adjust a periodicity, a threshold, and/or an offset associated with measurements of one or more reference signals from the NSA NR network to prevent future ping-pong events. As a result, the UE 120 may conserve processing and network resources by avoiding additional ping-pong events as well as increasing throughput and reducing CRC failures by waiting to add the NSA NR network as an SCG until measurements of the one or more reference signals improve.

As indicated above, FIG. 3 is provided as an example. Other examples may differ from what is described with respect to FIG. 3.

Figure 4:
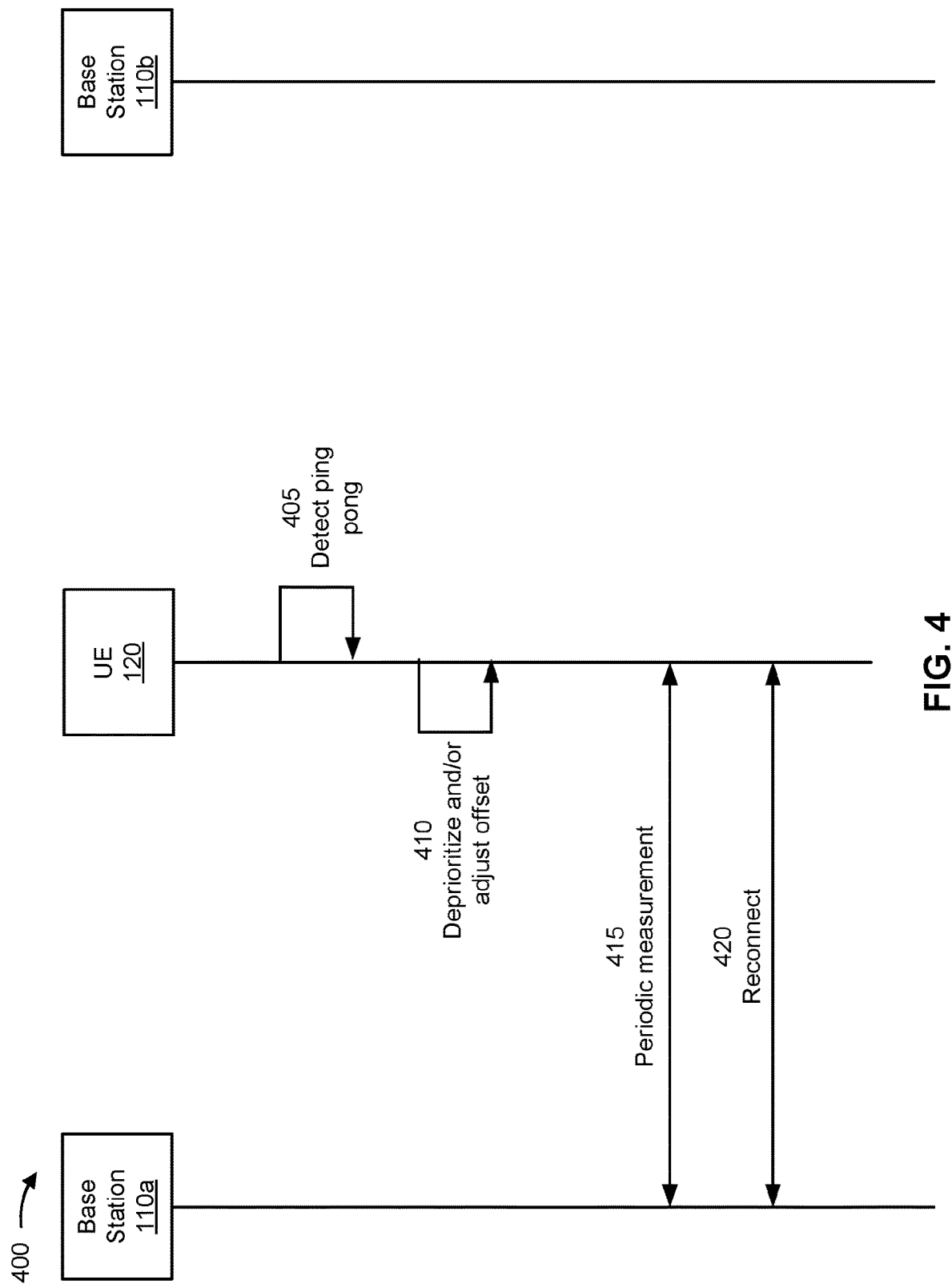

FIG. 4 is a diagram illustrating an example 400 associated with detecting and preventing ping-pong events, in accordance with various aspects of the present disclosure. As shown in FIG. 4, example 400 includes communication between a first base station 110*a* and a UE 120 as well as between a second base station 110*b* and the UE 120. In some aspects, the first base station 110*a* and the UE 120 may be included in a wireless network, such as wireless network 100. The first base station 110*a* may be a portion of a first SA network (e.g., an NR network or an LTE network). In some aspects, the second base station 110*b* and the UE 120 may be included in another wireless network, such as wireless network 100. The second base station 110*b* may be a portion of a second SA network (e.g., an NR network or an LTE network).

In some aspects, the first SA network comprises an NR network, and the second SA network comprises a legacy network (e.g., an LTE network). As an alternative, the first SA network may comprise a legacy network (e.g., an LTE network), and the second SA network may comprise an NR network.

As shown in connection with reference number 405, the UE 120 may detect a ping-pong event between the first SA network and the second SA network. For example, the first base station 110*a* may transmit, and the UE 120 may receive, an instruction (e.g., an RRC reconfiguration message as defined in 3GPP specifications and/or another similar message) to switch to another cell including the second base station 110*b*. However, after connecting to the second base station 110*b*, the UE 120 may experience poor signal quality and/or associate a cell including the first base station 110*a* with a higher priority than the cell including the second base station 110*b*. Therefore, the UE 120 may switch back to the cell including the first base station 110*a*. However, after connecting to the first base station 110*a*, the UE 120 may experience poor signal quality and/or associate the cell including the second base station 110*b* with a higher priority than the cell including the first base station 110*a*. Therefore, the UE 120 may switch back to the cell including the second base station 110*b*. A ping-pong event may thus include one or more cycles of switching between the cell including the first base station 110*a* and the cell including the second base station 110*b*.

Accordingly, in some aspects, the UE 120 may detect the ping-pong event by determining that a quantity of connections to the first SA network and disconnections from the first SA network satisfies a quantity threshold. For example, the UE 120 may detect the ping-pong event after one connection to the first SA network and one disconnection from the first SA network. In another example, the UE 120 may detect the ping-pong event after two connections to the first SA network and two disconnections from the first SA network. Other examples may include different quantities, such as three connections to the first SA network and three disconnections from the first SA network, four connections to the first SA network and four disconnections from the first SA network, and so on. The quantity threshold may be based at least in part on a configuration received from the first base station 110*a* or the second base station 110*b* and/or determined by the UE 120 (e.g., using records of previous ping-pong events). Additionally, or alternatively, the quantity threshold may be programmed (and/or otherwise preconfigured) into the UE 120, the first base station 110*a*, and/or the second base station 110*b* (e.g., based at least in part on 3GPP specifications and/or other standards).

In some aspects, the UE 120 may determine the quantity of connections to the first SA network and disconnections from the first SA network within a duration of time. For example, the UE 120 may determine a quantity of connections to the first SA network and disconnections from the first SA network within 1 minute, 2 minutes, 5 minutes, or X minutes, where X is an integer or a decimal amount. The duration of time may be based at least in part on a configuration received from the first base station 110*a* or the second base station 110*b* and/or determined by the UE 120 (e.g., using records of previous ping-pong events). Additionally, or alternatively, the duration of time may be programmed (and/or otherwise preconfigured) into the UE 120, the first base station 110*a*, and/or the second base station 110*b* (e.g., based at least in part on 3GPP specifications and/or other standards).

As shown in connection with reference number 410, the UE 120 may modify at least one of an offset or a priority associated with the first SA network based at least in part on the ping-pong event. In some aspects, the priority may be indicated using a flag in a database. For example, the UE 120 may store a flag associated with deprioritizing the first SA network coupled, in the database, to an ARFCN and/or another identifier of a frequency band used on the first SA network (e.g., a {flag, ARFCN} couplet and/or another similar data structure).

Additionally, or alternatively, the UE 120 may increase the offset associated with the first SA network based at least in part on detecting the ping-pong event. For example, the offset may include an offset associated with an event (such as a B1-NR event, a B2-NR event, and/or another event defined in 3GPP specifications and/or other standards). The offset may be relative to one or more measurements (e.g., an RSRP, an SNR, a CQI, or a combination thereof) of one or more reference signals (e.g., a DMRS, an SSB, a TRS, and/or another reference or synchronization signal) transmitted by the second base station 110*b*.

In some aspects, the UE 120 may additionally or alternatively refrain from measuring one or more reference signals for an amount of time after detecting the ping-pong event. For example, the UE 120 may refrain from measuring one or more reference signals (e.g., an SSB, a TRS, and/or another reference or synchronization signal), transmitted by the first base station 110*a*, for 1 minute, 2 minutes, 5 minutes, or X minutes, where X is an integer or a decimal amount. The amount of time may be based at least in part on a configuration received from the second base station 110*b* and/or determined by the UE 120 (e.g., using records of previous ping-pong events). Additionally, or alternatively, the amount of time may be programmed (and/or otherwise preconfigured) into the UE 120 and/or the second base station 110*b* (e.g., based at least in part on 3GPP specifications and/or other standards).

As shown in connection with reference number 415, the UE 120 may measure, periodically, the one or more reference signals from the first SA network. In some aspects, the one or more reference signals include an SSB, a TRS, or a combination thereof. For example, the UE 120 may measure the SSB, the TRS, and/or another synchronization signal transmitted by the first base station 110*a*. In some aspects, the measurements may include an RSRP, an SNR, a CQI, or a combination thereof. In some aspects, the SNR may be determined based at least in part on the SSB, the TRS, and/or another synchronization signal.

In some aspects, the periodicity associated with measuring the one or more reference signals is based at least in part on a mobility associated with the UE 120. For example, the UE 120 may determine a mobility (e.g., an estimated speed and/or estimated direction of movement) associated with the UE 120. The mobility may include a quantity (e.g., an estimated meters per second, kilometers per hour, or another numerical measure of speed and/or an estimated heading in degrees or another numerical measure of direction) and/or a quality (e.g., a classification of the UE 120 as 'stationary,' 'slowly moving,' or 'quickly moving,' or another non-numerical measure of speed and/or a classification of the UE 120 as moving north, south, east, or west, or another non-numerical measure of direction). In some aspects, the UE 120 may decrease a period (e.g., linearly, step-wise, and/or according to another formula) associated with measuring the one or more reference signals as the mobility increases. Similarly, the UE 120 may increase the period (e.g., linearly, step-wise, and/or according to another formula) as the mobility decreases.

As shown in connection with reference number 420, the UE 120 may reconnect to the first SA network based at least in part on the one or more reference signals satisfying at least one condition. In some aspects, UE 120 may determine whether one or more measurements (e.g., an RSRP, an SNR, a CQI, or a combination thereof) of the one or more reference signals satisfies the at least one condition. For example, the UE 120 may transmit, and the second base station 110*b* may receive, one or more measurements (e.g., an RSRP, an SNR, a CQI, or a combination thereof) of the one or more reference signals (e.g., an SSB, a TRS, and/or another synchronization signal) transmitted by the first base station 110*a*. Accordingly, the second base station 110*b* may transmit, and the UE 120 may receive, an instruction (e.g., an RRC reconfiguration message as defined in 3GPP specifications and/or another similar message) to switch to the cell including the first base station 110*a*.

In some aspects, the at least one condition may include the offset. As described above, the offset may include an offset associated with an event (such as a B1-NR event, a B2-NR event, and/or another event defined in 3GPP specifications and/or other standards). The offset may be relative to one or more measurements (e.g., an RSRP, an SNR, a CQI, or a combination thereof) of one or more reference signals (e.g., a DMRS, an SSB, a TRS, and/or another reference or synchronization signal) transmitted by the second base station 110*b*. In some aspects, the offset may be based at least in part on the ping-pong event. For example, the UE 120 may increase the offset based at least in part on detecting the ping-pong event. Additionally, or alternatively, the offset may be based at least in part on a mobility associated with the UE 120. For example, the UE 120 may decrease the offset (e.g., linearly, step-wise, and/or according to another formula) as the mobility increases. Similarly, the UE 120 may increase the offset (e.g., linearly, step-wise, and/or according to another formula) as the mobility decreases.

Additionally, or alternatively, the at least one condition may include a threshold associated with the first SA network. For example, the threshold may include a threshold associated with an event (such as a B1-NR event, a B2-NR event, and/or another event defined in 3GPP specifications and/or other standards). The threshold may be an absolute value for one or more measurements (e.g., an RSRP, an SNR, a CQI, or a combination thereof) of one or more reference signals (e.g., an SSB, a TRS, and/or another synchronization signal) transmitted by the first base station 110*a*. In some aspects, the threshold may be based at least in part on the ping-pong event. For example, the UE 120 may increase the threshold based at least in part on detecting the ping-pong event. Additionally, or alternatively, the threshold may be based at least in part on a mobility associated with the UE 120. For example, the UE 120 may decrease the threshold (e.g., linearly, step-wise, and/or according to another formula) as the mobility increases. Similarly, the UE 120 may increase the threshold (e.g., linearly, step-wise, and/or according to another formula) as the mobility decreases.

In some aspects, the at least one condition may include an offset and a threshold. For example, the UE 120 may evaluate both whether one or more measurements (e.g., an RSRP, an SNR, a CQI, or a combination thereof) of one or more reference signals (e.g., an SSB, a TRS, and/or another synchronization signal) transmitted by the first base station 110*a* satisfy the threshold and whether those measurements satisfy the offset, and then combine the evaluations (e.g., using an AND gate and/or another logic gate) to determine whether to reconnect to the NSA NR network (e.g., as described below in connection with reference number 325). As an alternative, the UE 120 may refrain from evaluating whether the one or more measurements satisfy the threshold until the UE 120 determines that the one or more measurements satisfy the offset. As an alternative, the UE 120 may refrain from evaluating whether the one or more measurements satisfy the offset until the UE 120 determines that the one or more measurements satisfy the threshold.

Additionally, or alternatively, the at least one condition may include the priority. For example, the UE 120 may refrain from measuring the one or more reference signals whenever a different data transmission to or data transmission from the second base station 110b is scheduled over a measurement occasion associated with the one or more reference signals. In some aspects, the priority may be based at least in part on the ping-pong event. For example, as described above, the UE 120 may deprioritize the first SA network based at least in part on detecting the ping-pong event.

In some aspects, the UE 120 may determine the at least one condition based on contextual information associated with the UE 120. The contextual information may include a date, a time of day, a location associated with the UE 120, a mobility associated with the UE 120, an identity associated with a user of the UE 120, and/or other contextual information received and/or determined by the UE 120. For example, the UE 120 may adjust the offset and/or the threshold based at least in part on a date and/or time of day. In such an example, the UE 120 may increase the offset and/or the threshold when the time of day is correlated with a pattern in which the UE 120 stays within a geographic area having a weaker signal from the first SA network. Additionally, or alternatively, the UE 120 may adjust the offset and/or the threshold based at least in part on a location associated with the UE 120 and/or a mobility associated with the UE 120. In such an example, the UE 120 may decrease the offset and/or the threshold when the mobility is correlated with movement into a geographic area having a stronger signal from the first SA network. Additionally, or alternatively, the UE 120 may adjust the offset and/or the threshold based at least in part on an identity associated with a user of the UE 120. In such an example, the UE 120 may deprioritize the first SA network when the user is correlated with one or more geographic areas having a weaker signal from the first SA network. In some aspects, the UE 120 may determine the at least one condition using a machine-learning model, such as at least one neural network and/or another machine-learning model.

By using the technique described in connection with FIG. 4, the UE 120 may detect a ping-pong event between the SA legacy network and the SA NR network. Additionally, in some aspects, the UE 120 may adjust a priority, a threshold, and/or an offset associated with measurements of one or more reference signals from the SA NR network or measurements of one or more reference signals from the SA legacy network in order to prevent future ping-pong events. As a result, the UE 120 may conserve processing and network resources by avoiding additional ping-pong events, as well as increase throughput and reduce CRC failures by selecting a stronger of the two SA networks to camp on.

As indicated above, FIG. 4 is provided as an example. Other examples may differ from what is described with respect to FIG. 4.

Figure 5:
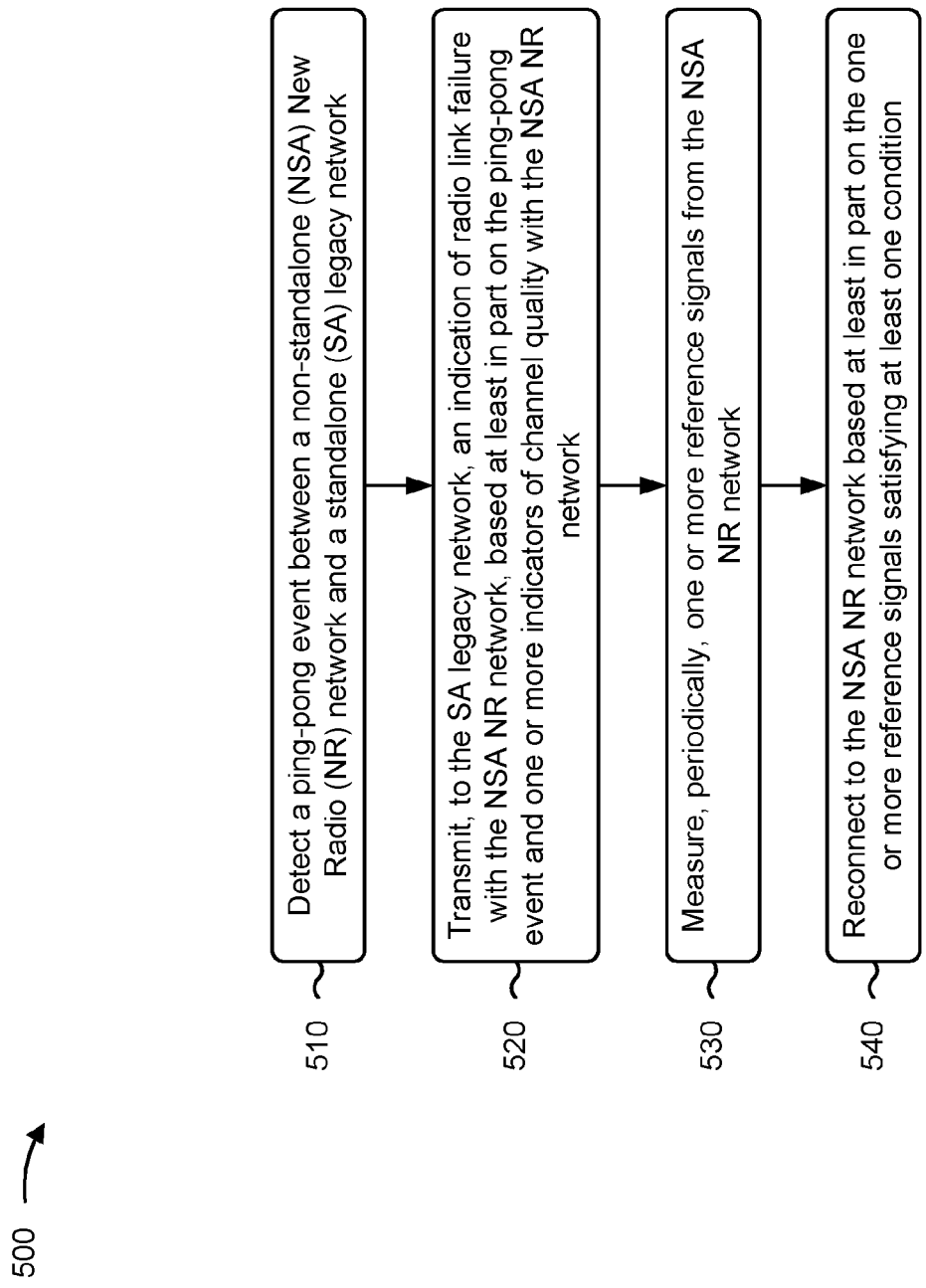
FIGS. 5 and 6 are diagrams illustrating example processes associated with detecting and preventing ping-pong events, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or apparatus 700 of FIG. 7) performs operations associated with detecting and preventing ping-pong events.

As shown in FIG. 5, in some aspects, process 500 may include detecting a ping-pong event between an NSA NR network and an SA legacy network (block 510). For example, the UE (e.g., using detection component 708, depicted in FIG. 7) may detect the ping-pong event between the NSA NR network and the SA legacy network, as described above.

As further shown in FIG. 5, in some aspects, process 500 may include transmitting, to the SA legacy network, an indication of RLF with the NSA NR network, based at least in part on the ping-pong event and one or more indicators of channel quality with the NSA NR network (block 520). For example, the UE (e.g., using transmission component 704, depicted in FIG. 7) may transmit, to the SA legacy network, the indication of RLF with the NSA NR network, based at least in part on the ping-pong event and one or more indicators of channel quality with the NSA NR network, as described above.

As further shown in FIG. 5, in some aspects, process 500 may include measuring, periodically, one or more reference signals from the NSA NR network (block 530). For example, the UE (e.g., using measurement component 710, depicted in FIG. 7) may measure, periodically, the one or more reference signals from the NSA NR network, as described above.

As further shown in FIG. 5, in some aspects, process 500 may include reconnecting to the NSA NR network based at least in part on the one or more reference signals satisfying at least one condition (block 540). For example, the UE (e.g., using transmission component 704) may reconnect to the NSA NR network based at least in part on the one or more reference signals satisfying at least one condition, as described above.

Process 500 may include additional aspects, such as any single aspect or any combination of aspects described below and/or in connection with one or more other processes described elsewhere herein.

In a first aspect, detecting the ping-pong event comprises determining that a quantity of secondary cell additions of the NSA NR network and secondary cell removals of the NSA NR network satisfies a quantity threshold.

In a second aspect, alone or in combination with the first aspect, the quantity of secondary cell additions of the NSA NR network and secondary cell removals of the NSA NR network is determined within a duration of time.

In a third aspect, alone or in combination with one or more of the first and second aspects, the one or more indicators of channel quality with the NSA NR network include an RSRP, an SNR, a CQI, or a combination thereof.

In a fourth aspect, alone or in combination with one or more of the first through third aspects, the indication of RLF is based at least in part on a PCI and an ARFCN.

In a fifth aspect, alone or in combination with one or more of the first through fourth aspects, the indication of RLF is transmitted based at least in part on the one or more indicators of channel quality with the NSA NR network satisfying at least one channel quality threshold.

In a sixth aspect, alone or in combination with one or more of the first through fifth aspects, the one or more reference signals include an SSB, a TRS, or a combination thereof.

In a seventh aspect, alone or in combination with one or more of the first through sixth aspects, a periodicity associated with measuring the one or more reference signals is based at least in part on a mobility associated with the UE.

In an eighth aspect, alone or in combination with one or more of the first through seventh aspects, the at least one condition includes an offset associated with the NSA NR network and the SA legacy network, and the offset is based at least in part on the ping-pong event.

In a ninth aspect, alone or in combination with one or more of the first through eighth aspects, the at least one condition includes a threshold associated with the NSA NR network, and the threshold is based at least in part on the ping-pong event.

In a tenth aspect, alone or in combination with one or more of the first through ninth aspects, process 500 further includes determining (e.g., using determination component 712, depicted in FIG. 7) the at least one condition based on contextual information associated with the UE.

In an eleventh aspect, alone or in combination with one or more of the first through tenth aspects, the at least one condition is determined using a machine-learning model.

In a twelfth aspect, alone or in combination with one or more of the first through eleventh aspects, the machine-learning model includes at least one neural network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
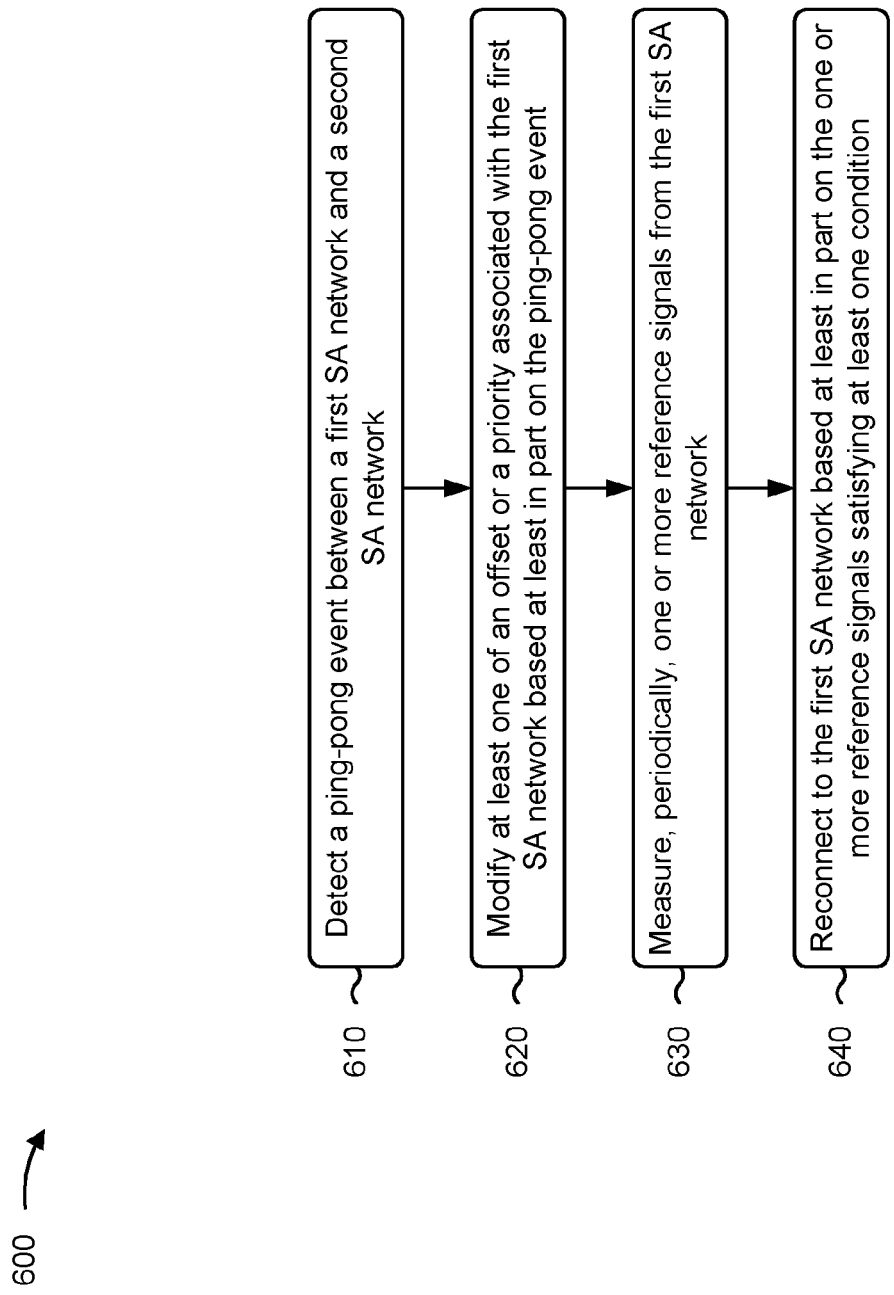

FIG. 6 is a diagram illustrating an example process 600 performed, for example, by a UE, in accordance with various aspects of the present disclosure. Example process 600 is an example where the UE (e.g., UE 120 and/or apparatus 700 of FIG. 7) performs operations associated with detecting and prevent ping-pong events.

As shown in FIG. 6, in some aspects, process 600 may include detecting a ping-pong event between a first SA network and a second SA network (block 610). For example, the UE (e.g., using detection component 708, depicted in FIG. 7) may detect the ping-pong event between the first SA network and the second SA network, as described above.

As further shown in FIG. 6, in some aspects, process 600 may include modifying at least one of an offset or a priority associated with the first SA network based at least in part on the ping-pong event (block 620). For example, the UE (e.g., using determination component 712, depicted in FIG. 7) may modify at least one of an offset or a priority associated with the first SA network based at least in part on the ping-pong event, as described above.

As further shown in FIG. 6, in some aspects, process 600 may include measuring, periodically, one or more reference signals from the first SA network (block 630). For example, the UE (e.g., using measurement component 710, depicted in FIG. 7) may measure, periodically, the one or more reference signals from the first SA network, as described above.

As further shown in FIG. 6, in some aspects, process 600 may include reconnecting to the first SA network based at least in part on the one or more reference signals satisfying at least one condition (block 640). For example, the UE (e.g., using transmission component 704, depicted in FIG. 7) may reconnect to the first SA network based at least in part on the one or more reference signals satisfying at least one condition, as described above.

Process 600 may include additional aspects, such as any single aspect or any combination of aspects described below and/or in connection with one or more other processes described elsewhere herein.

In a first aspect, the first SA network comprises an NR network, and the second SA network comprises a legacy network.

In a second aspect, alone or in combination with the first aspect, the first SA network comprises a legacy network, and the second SA network comprises an NR network.

In a third aspect, alone or in combination with one or more of the first and second aspects, detecting the ping-pong event comprises determining that a quantity of connections to the first SA network and disconnections from the first SA network satisfies a quantity threshold.

In a fourth aspect, alone or in combination with one or more of the first through third aspects, the quantity of connections to the first SA network and disconnections from the first SA network is determined within a duration of time.

In a fifth aspect, alone or in combination with one or more of the first through fourth aspects, the priority is indicated using a flag in a database.

In a sixth aspect, alone or in combination with one or more of the first through fifth aspects, process 600 further includes refraining from measuring (e.g., using measurement component 710) the one or more reference signals for an amount of time after detecting the ping-pong event.

In a seventh aspect, alone or in combination with one or more of the first through sixth aspects, the one or more reference signals include an SSB, a TRS, or a combination thereof.

In an eighth aspect, alone or in combination with one or more of the first through seventh aspects, the at least one condition includes the offset, and the offset is based at least in part on the ping-pong event.

In a ninth aspect, alone or in combination with one or more of the first through eighth aspects, the at least one condition includes the priority, and the priority is based at least in part on the ping-pong event.

In a tenth aspect, alone or in combination with one or more of the first through ninth aspects, the at least one condition includes a threshold associated with the first SA network, and the threshold is based at least in part on the ping-pong event.

In an eleventh aspect, alone or in combination with one or more of the first through tenth aspects, process 600 further includes determining (e.g., using determination component 712) the at least one condition based on contextual information associated with the UE.

In a twelfth aspect, alone or in combination with one or more of the first through eleventh aspects, the at least one condition is determined using a machine-learning model.

In a thirteenth aspect, alone or in combination with one or more of the first through twelfth aspects, the machine-learning model includes at least one neural network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
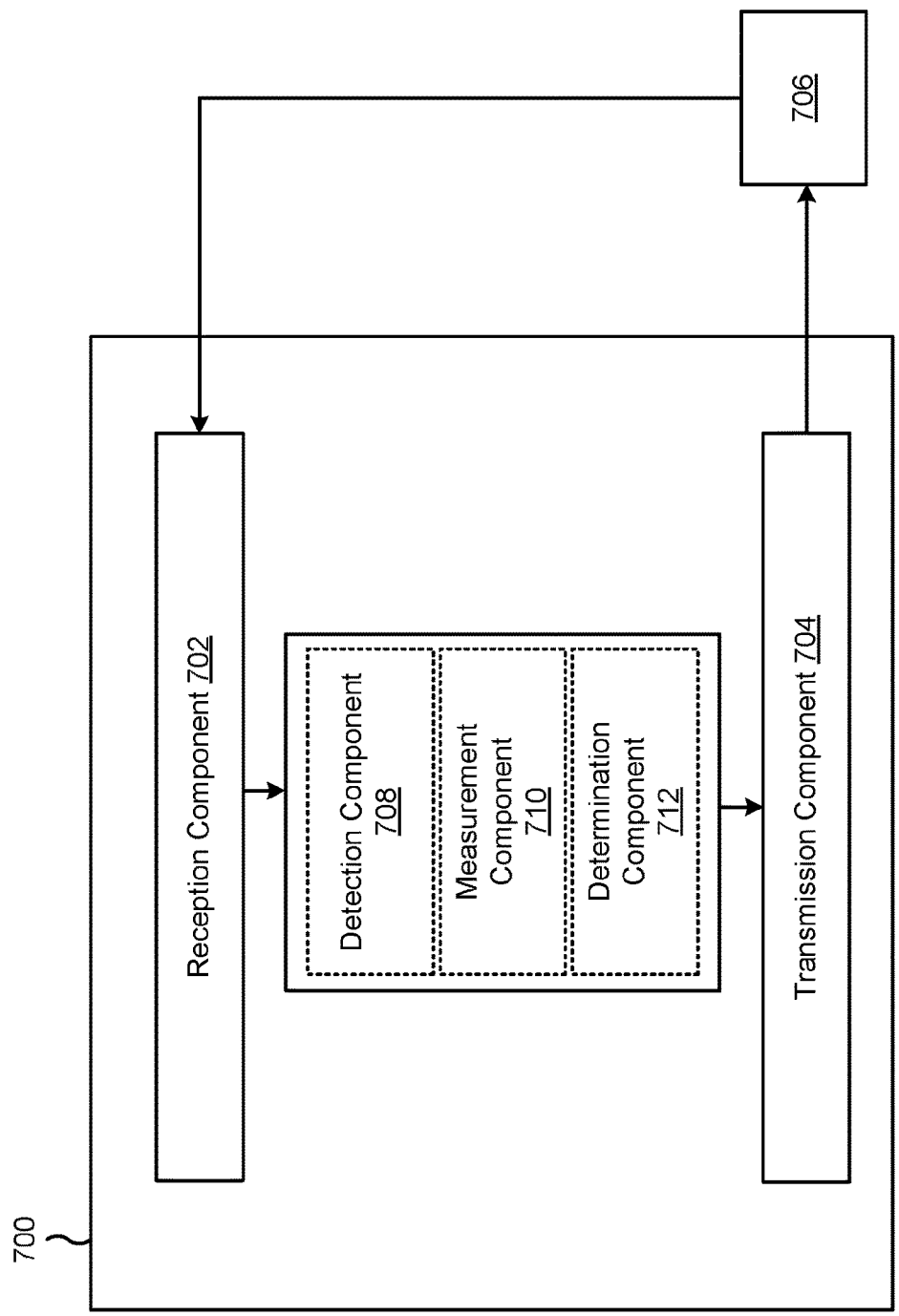
FIGS. 7 and 8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a detection component 708, a measurement component 710, or a determination component 712, among other examples.

In some aspects, the apparatus 700 may be configured to perform one or more operations described herein. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

In some aspects, the detection component 708 may detect a ping-pong event between an NSA NR network and an SA legacy network. In some aspects, the detection component 708 may include a MIMO detector, a receive processor, a transmit MIMO processor, a transmit processor, a controller/processor, a memory, or a combination thereof, of the UE described above in connection with FIG. 2. Accordingly, the transmission component 704 may transmit, to the SA legacy network (e.g., via the apparatus 706), an indication of RLF with the NSA NR network, based at least in part on the detection component 708 detecting the ping-pong event and one or more indicators of channel quality with the NSA NR network. Additionally, the measurement component 710 may measure, periodically, one or more reference signals from the NSA NR network. In some aspects, the measurement component 710 may include one or more antennas, a demodulator, a MIMO detector, a receive processor, a controller/processor, a memory, or a combination thereof, of the UE described above in connection with FIG. 2. Accordingly, the transmission component 704 may reconnect to the NSA NR network based at least in part on the one or more reference signals satisfying at least one condition. In some aspects, the determination component 712 may determine the at least one condition based on contextual information associated with the UE. In some aspects, the determination component 712 may include a receive processor, a transmit processor, a controller/processor, a memory, or a combination thereof, of the UE described above in connection with FIG. 2.

In some aspects, the detection component 708 may detect a ping-pong event between a first SA network and a second SA network. Accordingly, the determination component 712 may modify at least one of an offset or a priority associated with the first SA network based at least in part on the ping-pong event. Additionally, the measurement component 710 may measure, periodically, one or more reference signals from the first SA network. Moreover, the transmission component 704 may reconnect to the first SA network based at least in part on the one or more reference signals satisfying at least one condition. In some aspects, the determination component 712 may determine the at least one condition based on contextual information associated with the UE.

In any of the aspects described above, the measurement component 710 may refrain from measuring the one or more reference signals for an amount of time after detecting the ping-pong event.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
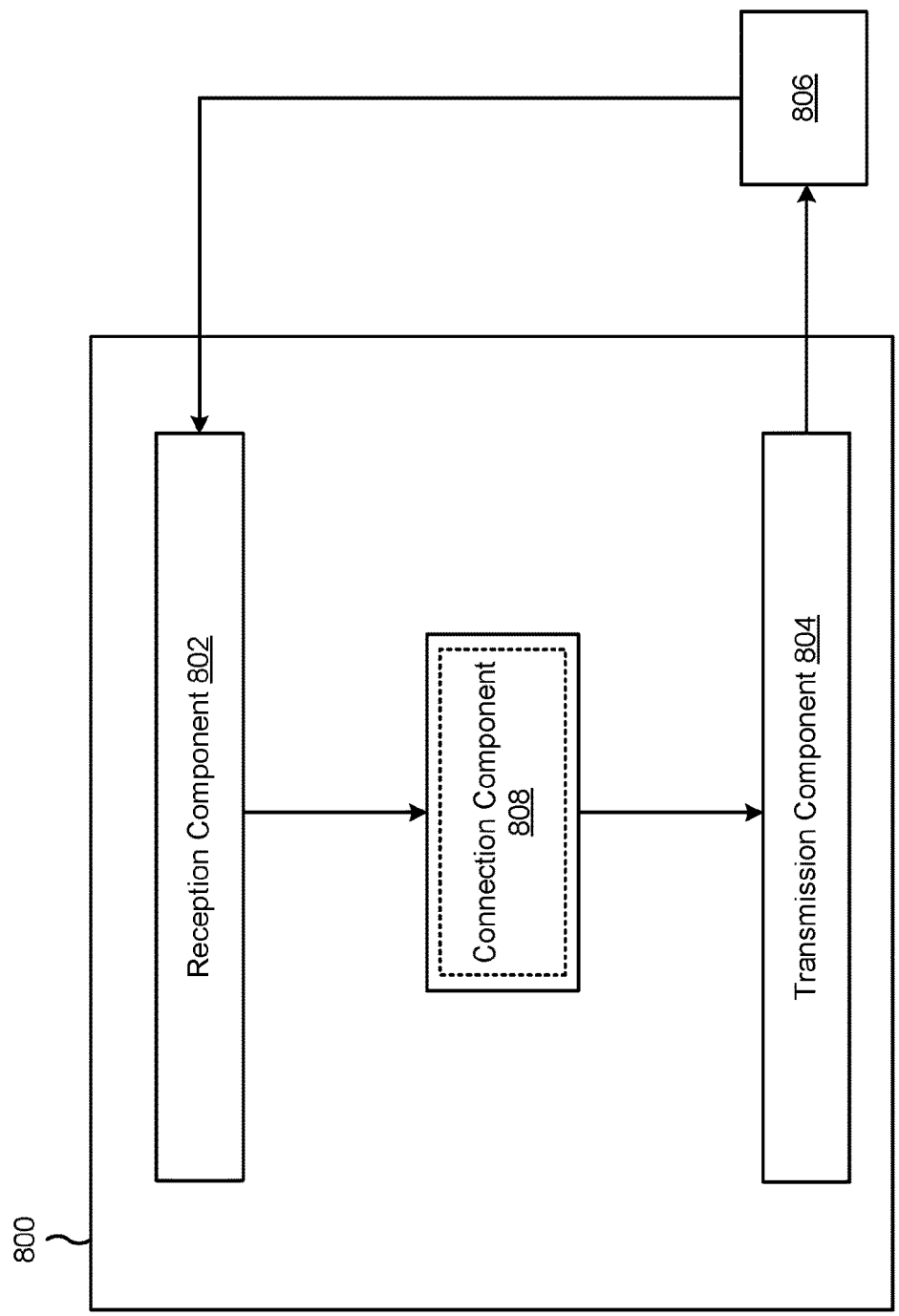

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a connection component 808, among other examples.

In some aspects, the apparatus 800 may be configured to perform one or more operations described herein. Additionally, or alternatively, the apparatus 800 may be configured to perform one or more processes described herein, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

In some aspects, the apparatus 800 may be associated with an SA network. Accordingly, the reception component 802 may receive, from the apparatus 806, an indication of RLF with an NSA NR network, based at least in part on a ping-pong event (e.g., adding and removing the NSA NR network) and one or more indicators of channel quality with the NSA NR network.

Additionally, or alternatively, the transmission component 804 may transmit, to the apparatus 806, one or more reference signals (e.g., for measurement). In some aspects, the apparatus 800 may transmit the one or more reference signals according to a periodicity. Additionally, the connection component 808 may reconnect the apparatus 806 to the SA network based at least in part on the one or more reference signals satisfying at least one condition. In some aspects, the connection component 808 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

In some aspects, the apparatus 800 may be associated with an NSA network. Accordingly, the transmission component 804 may transmit, to the apparatus 806, one or more reference signals (e.g., for measurement). In some aspects, the apparatus 800 may transmit the one or more reference signals according to a periodicity. Additionally, the connection component 808 may reconnect the apparatus 806 to the NSA NR network based at least in part on the one or more reference signals satisfying at least one condition.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: detecting a ping-pong event between a non-standalone (NSA) New Radio (NR) network and a standalone (SA) legacy network; transmitting, to the SA legacy network, an indication of radio link failure (RLF) with the NSA NR network, based at least in part on the ping-pong event and one or more indicators of channel quality with the NSA NR network; measuring, periodically, one or more reference signals from the NSA NR network; and reconnecting to the NSA NR network based at least in part on the one or more reference signals satisfying at least one condition.

Aspect 2: The method of aspect 1, wherein detecting the ping-pong event comprises determining that a quantity of secondary cell additions of the NSA NR network and secondary cell removals of the NSA NR network satisfies a quantity threshold.

Aspect 3: The method of aspect 2, wherein the quantity of secondary cell additions of the NSA NR network and secondary cell removals of the NSA NR network is determined within a duration of time.

Aspect 4: The method of any of aspects 1 through 3, wherein the one or more indicators of channel quality with the NSA NR network include: a reference signal received power (RSRP), a signal-to-noise ratio (SNR), a channel quality indicator (CQI), or a combination thereof.

Aspect 5: The method of any of aspects 1 through 4, wherein the indication of RLF is based at least in part on a physical cell identifier (PCI) and an absolute radio frequency channel number (ARFCN).

Aspect 6: The method of any of aspects 1 through 5, wherein the indication of RLF is transmitted based at least in part on the one or more indicators of channel quality with the NSA NR network satisfying at least one channel quality threshold.

Aspect 7: The method of any of aspects 1 through 6, wherein the one or more reference signals include a synchronization signal block (SSB), a tracking reference signal (TRS), or a combination thereof.

Aspect 8: The method of any of aspects 1 through 7, wherein a periodicity associated with measuring the one or more reference signals is based at least in part on a mobility associated with the UE.

Aspect 9: The method of any of aspects 1 through 8, wherein the at least one condition includes an offset associated with the NSA NR network and the SA legacy network, and wherein the offset is based at least in part on the ping-pong event.

Aspect 10: The method of any of aspects 1 through 9, wherein the at least one condition includes a threshold associated with the NSA NR network, and wherein the threshold is based at least in part on the ping-pong event.

Aspect 11: The method of any of aspects 1 through 10, further comprising: determining the at least one condition based on contextual information associated with the UE.

Aspect 12: The method of aspect 11, wherein the at least one condition is determined using a machine-learning model.

Aspect 13: The method of aspect 12, wherein the machine-learning model includes at least one neural network.

Aspect 14: A method of wireless communication performed by a UE, comprising: detecting a ping-pong event between a first SA network and a second SA network; modifying at least one of an offset or a priority associated with the first SA network based at least in part on the ping-pong event; measuring, periodically, one or more reference signals from the first SA network; and reconnecting to the first SA network based at least in part on the one or more reference signals satisfying at least one condition.

Aspect 15: The method of aspect 14, wherein the first SA network comprises an NR network, and the second SA network comprises a legacy network.

Aspect 16: The method of aspect 14, wherein the first SA network comprises a legacy network, and the second SA network comprises an NR network.

Aspect 17: The method of any of aspects 14 through 16, wherein detecting the ping-pong event comprises determining that a quantity of connections to the first SA network and disconnections from the first SA network satisfies a quantity threshold.

Aspect 18: The method of aspect 17, wherein the quantity of connections to the first SA network and disconnections from the first SA network is determined within a duration of time.

Aspect 19: The method of any of aspects 14 through 18, wherein the priority is indicated using a flag in a database.

Aspect 20: The method of any of aspects 14 through 19, further comprising: refraining from measuring the one or more reference signals for an amount of time after detecting the ping-pong event.

Aspect 21: The method of any of aspects 14 through 20, wherein the one or more reference signals include an SSB, a TRS, or a combination thereof.

Aspect 22: The method of any of aspects 14 through 21, wherein the at least one condition includes the offset, and wherein the offset is based at least in part on the ping-pong event.

Aspect 23: The method of any of aspects 14 through 22, wherein the at least one condition includes the priority, and wherein the priority is based at least in part on the ping-pong event.

Aspect 24: The method of any of aspects 14 through 23, wherein the at least one condition includes a threshold associated with the first SA network, and wherein the threshold is based at least in part on the ping-pong event.

Aspect 25: The method of any of aspects 14 through 24, further comprising: determining the at least one condition based on contextual information associated with the UE.

Aspect 26: The method of aspect 25, wherein the at least one condition is determined using a machine-learning model.

Aspect 27: The method of aspect 26, wherein the machine-learning model includes at least one neural network.

Aspect 28: An apparatus for wireless communication at a device, comprising a processor; memory coupled with the processor; and instructions stored in the memory and executable by the processor to cause the apparatus to perform the method of one or more aspects of aspects 1-13.

Aspect 29: A device for wireless communication, comprising a memory and one or more processors coupled to the memory, the memory and the one or more processors configured to perform the method of one or more aspects of aspects 1-13.

Aspect 30: An apparatus for wireless communication, comprising at least one means for performing the method of one or more aspects of aspects 1-13.

Aspect 31: A non-transitory computer-readable medium storing code for wireless communication, the code comprising instructions executable by a processor to perform the method of one or more aspects of aspects 1-13.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 33: An apparatus for wireless communication at a device, comprising a processor; memory coupled with the processor; and instructions stored in the memory and executable by the processor to cause the apparatus to perform the method of one or more aspects of aspects 14-27.

Aspect 34: A device for wireless communication, comprising a memory and one or more processors coupled to the memory, the memory and the one or more processors configured to perform the method of one or more aspects of aspects 14-27.

Aspect 35: An apparatus for wireless communication, comprising at least one means for performing the method of one or more aspects of aspects 14-27.

Aspect 36: A non-transitory computer-readable medium storing code for wireless communication, the code comprising instructions executable by a processor to perform the method of one or more aspects of aspects 14-27.

Aspect 37: A non-transitory computer-readable medium storing a set of instructions for wireless communication, the set of instructions comprising one or more instructions that, when executed by one or more processors of a device, cause the device to perform the method of one or more aspects of aspects 14-27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    detecting a ping-pong event between a non-standalone (NSA) New Radio (NR) network and a standalone (SA) legacy network;
    transmitting, to the SA legacy network, an indication of radio link failure (RLF) with the NSA NR network, based at least in part on the ping-pong event and one or more indicators of channel quality with the NSA NR network;
    measuring, periodically, one or more reference signals from the NSA NR network; and
    reconnecting to the NSA NR network based at least in part on the one or more reference signals satisfying at least one condition.

2. A method of wireless communication performed by a user equipment (UE), comprising:
    detecting a ping-pong event between a first standalone (SA) network and a second SA network;
    modifying at least one of an offset or a priority associated with the first SA network based at least in part on the ping-pong event;
    measuring, periodically, one or more reference signals from the first SA network; and
    reconnecting to the first SA network based at least in part on the one or more reference signals satisfying at least one condition.

3. The method of claim 2, wherein the first SA network comprises a New Radio (NR) network, and the second SA network comprises a legacy network.

4. The method of claim 2, wherein the first SA network comprises a legacy network, and the second SA network comprises a New Radio (NR) network.

5. A user equipment (UE) for wireless communication, comprising:
    a memory; and
    one or more processors operatively coupled to the memory, the memory and the one or more processors configured to:
        detect a ping-pong event between a non-standalone (NSA) New Radio (NR) network and a standalone (SA) legacy network;
        transmit, to the SA legacy network, an indication of radio link failure (RLF) with the NSA NR network, based at least in part on the ping-pong event and one or more indicators of channel quality with the NSA NR network;
        measure, periodically, one or more reference signals from the NSA NR network; and
        reconnect to the NSA NR network based at least in part on the one or more reference signals satisfying at least one condition.

6. The UE of claim 5, wherein the one or more processors, when detecting the ping-pong event, are configured to determine that a quantity of secondary cell additions of the NSA NR network and secondary cell removals of the NSA NR network satisfies a quantity threshold.

7. The UE of claim 6, wherein the quantity of secondary cell additions of the NSA NR network and secondary cell removals of the NSA NR network is determined within a duration of time.

8. The UE of claim 5, wherein the one or more indicators of channel quality with the NSA NR network include:
    a reference signal received power (RSRP),
    a signal-to-noise ratio (SNR),
    a channel quality indicator (CQI), or
    a combination thereof.

9. The UE of claim 5, wherein the indication of RLF is based at least in part on a physical cell identifier (PCI) and an absolute radio frequency channel number (ARFCN).

10. The UE of claim 5, wherein the indication of RLF is transmitted based at least in part on the one or more indicators of channel quality with the NSA NR network satisfying at least one channel quality threshold.

11. The UE of claim 5, wherein the one or more reference signals include a synchronization signal block (SSB), a tracking reference signal (TRS), or a combination thereof.

12. The UE of claim 5, wherein a periodicity associated with measuring the one or more reference signals is based at least in part on a mobility associated with the UE.

13. The UE of claim 5, wherein the at least one condition includes an offset associated with the NSA NR network and the SA legacy network, and wherein the offset is based at least in part on the ping-pong event.

14. The UE of claim 5, wherein the at least one condition includes a threshold associated with the NSA NR network, and wherein the threshold is based at least in part on the ping-pong event.

15. The UE of claim 5, wherein the one or more processors are further configured to:
determine the at least one condition based on contextual information associated with the UE.

16. The UE of claim 15, wherein the at least one condition is determined using a machine-learning model.

17. A user equipment (UE) for wireless communication, comprising:
a memory; and
one or more processors operatively coupled to the memory, the memory and the one or more processors configured to:
detect a ping-pong event between a first standalone (SA) network and a second SA network;
modify at least one of an offset or a priority associated with the first SA network based at least in part on the ping-pong event;
measure, periodically, one or more reference signals from the first SA network; and
reconnect to the first SA network based at least in part on the one or more reference signals satisfying at least one condition.

18. The UE of claim 17, wherein the first SA network comprises a New Radio (NR) network, and the second SA network comprises a legacy network.

19. The UE of claim 17, wherein the first SA network comprises a legacy network, and the second SA network comprises a New Radio (NR) network.

20. The UE of claim 17, wherein the one or more processors, when detecting the ping-pong event, are configured to determine that a quantity of connections to the first SA network and disconnections from the first SA network satisfies a quantity threshold.

21. The UE of claim 20, wherein the quantity of connections to the first SA network and disconnections from the first SA network is determined within a duration of time.

22. The UE of claim 17, wherein the priority is indicated using a flag in a database.

23. The UE of claim 17, wherein the one or more processors are further configured to:
refrain from measuring the one or more reference signals for an amount of time after detecting the ping-pong event.

24. The UE of claim 17, wherein the one or more reference signals include a synchronization signal block (SSB), a tracking reference signal (TRS), or a combination thereof.

25. The UE of claim 17, wherein the at least one condition includes the offset, and wherein the offset is based at least in part on the ping-pong event.

26. The UE of claim 17, wherein the at least one condition includes the priority, and wherein the priority is based at least in part on the ping-pong event.

27. The UE of claim 17, wherein the at least one condition includes a threshold associated with the first SA network, and wherein the threshold is based at least in part on the ping-pong event.

28. The UE of claim 17, wherein the one or more processors are further configured to:
determine the at least one condition based on contextual information associated with the UE.

29. The UE of claim 28, wherein the at least one condition is determined using a machine-learning model.

30. The UE of claim 29, wherein the machine-learning model includes at least one neural network.

* * * * *